April 24, 1945.  T. W. EVANS ET AL  2,374,476
HYDROGEN HALIDE RECOVERY
Filed April 28, 1942
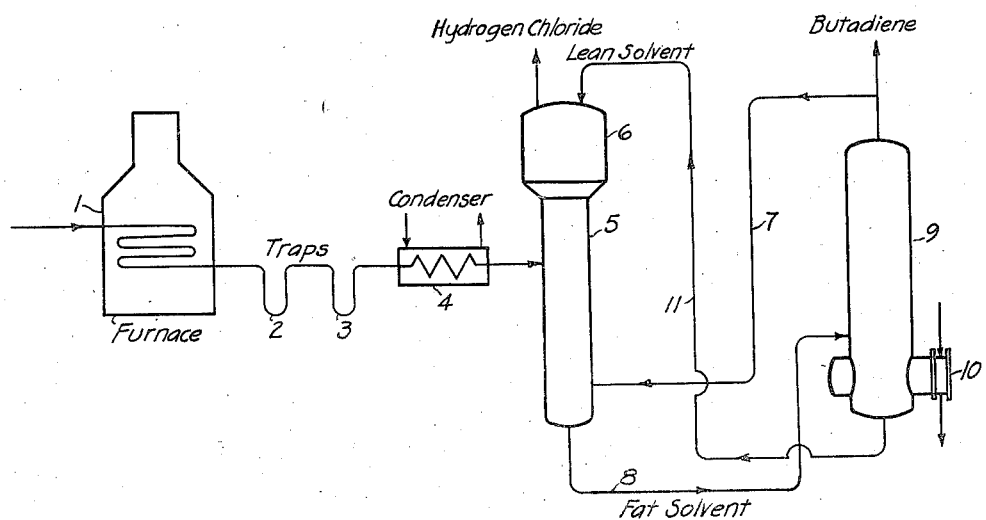
Inventors: George W. Hearne
Theodore W. Evans
Harry De V. Finch.
By their Attorney:

Patented Apr. 24, 1945

2,374,476

UNITED STATES PATENT OFFICE 2,374,476

HYDROGEN HALIDE RECOVERY

Theodore W. Evans, Oakland, and Harry de V. Finch and George W. Hearne, Berkeley, Calif., assignors to Shell Development Company, San Francisco, Calif., a corporation of Delaware Application April 28, 1942, Serial No. 440,790

11 Claims. (Cl. 183—115)

This invention relates to the recovery of hydrogen halides. More particularly, the invention provides a practical and economical method for recovering hydrogen halides in an anhydrous or substantially anhydrous state from gaseous mixtures containing hydrogen halides and olefinic hyrocarbons.

There are a number of technical and industrial processes, the execution of which results in the formation of an intermediate or final reaction mixture of gaseous character, comprising a mono- and/or a diolefin and a hydrogen halide. Examples of such processes are the processes for effecting the halogenation of olefins via substitution in which the olefin in the reaction mixture represents unreacted material, the process for producing diolefins described in U. S. Letters Patent 2,259,195 wherein paraffinic and/or olefinic hydrocarbons of 3 to 5 carbon atoms are dehydrogenated in the presence of sufficient halogen to react with all of the hydrogens split off, and the catalytic and non-catalytic processes for effecting the dehydrohalogenation of dihalogenated hydrocarbons and unsaturated monohalogenated hydrocarbons. In all of these processes, the separate and complete removal of the hydrogen halide substantially as soon as formed is essential or at least desirable. For instance, in the processes of the last-mentioned class, unless the hydrogen halide is so removed, the continued contact thereof with the diolefin produced as a result of the dehydrohalogenation may result in the addition of hydrogen halide molecules to the unsaturated carbon atoms of the diolefin, or, in other words, in the recombination of the diolefin and the hydrogen halide.

It is known that hydrogen halides may be separated from mixtures thereof with olefins, which mixtures may comprise other components such as halogenated hydrocarbons, by water scrubbing. It is also known to treat a mixture containing a hydrogen halide and an olefin with a basic acting agent, whereby the hydrogen halide is converted to a readily separable neutral salt. The prior art still further suggests the fractional condensation or fractional distillation, after liquefaction, of such mixtures as a means of recovering the hydrogen halide present therein.

The above-known methods for separating hydrogen halides from mixtures with olefins are uneconomical and hence undesirable for several reasons. When such mixtures are washed or scrubbed with water, the hydrogen halide is obtained as a dilute aqueous solution which is of little commercial significance, anhydrous hydrogen halides being required, or at least being more desirable, for most purposes such as organic synthesis or in the manufacture of halogens, particularly chlorine, by the Deacon process and modifications thereof. While the aqueous solution may be distilled to recover anhydrous hydrogen halide, only partial recovery is possible without considerable expense as the hydrogen halides form maximum boiling mixtures with water. Aside from the added expense incurred by reason of the use of basic or basic acting materials, this procedure is uneconomical and hence undesirable, because of the total loss of the hydrogen halide which, as stated, is converted to a metal salt. The methods of fractional condensation or fractional distillation after liquefaction require elaborate and costly refrigerating and/or pressure equipment, and, moreover, under the conditions necessarily prevailing, the major portion of the olefin, particularly if a diolefin, may be lost through polymerization or converted or reconverted to undesired halo derivatives.

The process of the invention, which is easily and cheaply performed, avoids the defects of the methods known heretofore, in that the hydrogen halide is directly recovered from reaction mixtures of the type indicated in an anhydrous state, in which state it is more valuable and adapted to a greater variety of commercial uses, the recovery thereof being effected under such conditions that the primary purpose of the process responsible for the reaction mixture is realized.

While the present process may be applied to effect the recovery of hydrogen halides from mixtures comprising normally liquid olefinic hydrocarbons, for example, amylenes such as pentene-1, pentene-2, 2-methyl-butene-1, 2-methyl-butene-2, 3-methyl-butene-3, cyclopentene, and diolefins such as piperylene and isoprene, it is most specifically directed to the separation of hydrogen halides from mixtures with olefinic hydrocarbons of lower molecular weight, i. e., ethylene, propylene, alpha and beta butylene, isobutylene, allene, butadiene. The treated mixture may contain in addition one or a plurality of saturated hydrocarbons and/or one or more halo-substituted hydrocarbons which may be either normally gaseous or normally liquid compounds.

The process comprises contacting a hydrogen halide-olefinic hydrocarbon-containing mixture with an organic liquid or liquefied material, which (a) Possesses a higher boiling point than that of the olefinic hydrocarbon in the mixture;

(b) Is a good solvent for the olefinic hydrocarbon but a poor solvent for the hydrogen halide;

(c) Does not materially promote recombination of the hydrogen halide and the olefinic hydrocarbon under the operating conditions;

(d) Does not cause extensive polymerization of the olefinic hydrocarbon under the operating conditions;

(e) Does not exhibit a strong tendency itself to combine with the hydrogen halide and/or olefinic hydrocarbon under the operating conditions.

According to the invention, the olefinic hydrocarbon is selectively dissolved by the solvent and a residue consisting of substantially pure anhydrous hydrogen halide thereby obtained.

Any suitable means of contacting the gaseous mixture with the organic liquid or liquefied material may be employed but processes of this type are in general carried out in two principal ways. In the first the vapors are scrubbed by the relatively higher boiling selective solvent in a tower provided with suitable contact elements such as plates by a stream of the selective solvent flowing counter-currently to the vapor. In the second, the so-called extractive distillation, which represents a preferred method of executing the invention, the selective solvent is caused to flow down the distillation column as the mixture is distilled. Thus, the solvent scrubs the vapors in a first zone of contact, selectively dissolving the more soluble component, and the resulting fat solvent is partially stripped in the lower part of the column, where the ascending vapors are at a higher temperature. A number of variations in each of the described methods is possible and certain features of both may be advantageously combined.

Among substances or classes of substances meeting the above-outlined requirements may be mentioned: paraffins and iso-paraffins of four or more carbon atoms, naphthenes, such as dimethylcyclopropane, methyl cyclobutane, cyclopentane, methyl cyclopentane, cyclohexane, isopropylcyclobutane, cycloheptane, cyclo-octane, etc., aromatic hydrocarbons, such as benzene, ethyl-benzene, toluene, xylene and other polyalkylbenzenes, and halo-substituted hydrocarbons including carbon tetrachloride and the halogen derivatives of unsaturated hydrocarbons. The use of oxy compounds, such as alcohols, carboxylic acids, acid esters, ethers, and di-ethers and the like as the solvent in the execution of the process constituting the invention is not within the scope thereof, such compounds being distinguished in that they have a greater solvent power for the hydrogen halides than for mono-olefins and diolefins.

An advantage of the present invention resides in the fact that in most instances of its application one or more of the reaction products other than the olefinic hydrocarbon and hydrogen halide present in the material being treated may be separated therefrom and employed as the solvent. For example, in the pyrolytic dehydrohalogenation of dihalogenated hydrocarbons, the unsaturated mono-chlorides produced as a result of the reaction constitute a very satisfactory material.

The solvents specifically named and inferentially included above are not to be considered as exact equivalents, as their selectivity for the olefinic hydrocarbons and the absolute solubility of olefinic hydrocarbons therein varies within relatively wide limits. Moreover, certain of the above compounds display a greater tendency to react with hydrogen halides and/or olefinic hydrocarbons or to promote polymerization of the latter than others. However, with proper control of temperature, pressure, reflux ratio, and ratio of solvent to treated material, any one or substantially any combination of these compounds can be successfully applied to the present process, and hence are properly included within the scope of the invention. There exists for each of the above compounds and combinations thereof, optimum conditions under which they are most effective in bringing about the desired separation which can be readily determined by simple experiments well within the skill of those experienced in the art. In general, it is preferred to execute the process with solvents boiling within the range of from about 40° C. to 250° C. which have sufficient selectivity and inherent solvent power for olefinic hydrocarbons to effect separation thereof from hydrogen halides at low temperatures and pressures. By low temperatures is meant kettle temperatures within the range of from about 25° C. to 250° C. and by low pressures column pressures of from about 1 to 4 atmospheres.

A complete understanding of the instant process will be facilitated by reference to the accompanying schematic drawing which represents a flow diagram illustrating one method of operating the same. The drawing is to be understood as illustrative merely, and not to any degree restrictive. Also for purposes of illustration only, the treated material may be considered as a vapor mixture consisting of butadiene, hydrogen chloride, the unsaturated mono-chlorides, 2-chlorobutene-2, 1-chlorobutene-2, and 3-chlorobutene-1 and dichlorobutane. Such a mixture results from the pyrolysis of dichlorobutanes.

With reference to the drawing, the numeral 1 designates a pyrolysis furnace in which the dehydrohalogenation of the dichlorobutane feed, which preferably predominates in 2,3-dichlorobutane, is effected. While the manner of accomplishing the dehydrohalogenation is immaterial so far as the instant invention is concerned, a higher yield of the usually preferred product, butadiene, will be found to result if the temperature of the furnace is maintained substantially within the range 675° C.–775° C. The use of a dehydrohalogenation catalyst at this temperature is unnecessary, and has in fact been found disadvantageous as tending toward the excessive formation of tar and coke. The dichloride is preferably introduced into the furnace in a vapor state, vaporization thereof being effected either in a separate vaporizer, not indicated, or in the fore part of the reaction tube which may be packed or unpacked. If it is desired to pack the tube, suitable non-reactive materials include carbon chips, glass wool, pumice and porcelain chips. The rate of feed to the furnace is determined inter alia by the size of the reaction tube and the exact temperature applied. A feed rate of 20 pounds of the dichloride per hour through a tube 6 feet x 2 inches maintained at a temperature of 649° C. has been found to provide an excellent yield of butadiene.

The vaporous reaction mixture from the furnace is led through tar traps 2 and 3 and condenser 4 prior to its introduction into a distillation column 5, which may be a spray, packed, or bubble plate column, at about the center section thereof. Column 5 is provided with a jacketed upper section 6 in which water or other cooling agent may be circulated for the purpose explained hereinafter. The condenser 4, which is optional, serves to remove from the mixture substantially all of the unsaturated monochlorides and the unreacted dichloride present therein. The unreacted dichloride is preferably recycled to the furnace, while the monochlorides, particularly if predominating in 2-chlorobutene-2 which is somewhat difficult to further dehydrohalogenate under the same conditions, are recovered as by-products.

A solvent, which is a good solvent for the butadiene, but a poor solvent for the hydrogen halide, and which possesses the other necessary characteristics previously outlined, is introduced at or near the top of the jacketed portion 6 of the column 5. As the vaporous mixture from the condenser 4 which now consists essentially of butadiene and hydrogen chloride, ascends into the column 5, it is met by the descending solvent which selectively dissolves the butadiene, together with a relatively small amount of the hydrogen chloride. Upon continuing its descent, the fat or enriched solvent is contacted in the lower portion of the column by vapor ascending from the base thereof supplied thereto by line 7. This vapor, which in effect constitutes a "bottom reflux" displaces the relatively small amount of hydrogen chloride which became dissolved in the solvent during its initial contact with the mixture in the upper zone of the column. The displaced hydrogen chloride rises in the column and is ultimately evolved at the top thereof along with the hydrogen chloride initially separated from the mixture. As should be apparent from the drawing and the immediate foregoing, the vapor in the jacketed zone of the column consists predominantly of hydrogen chloride at all times. Since this portion of the column, which may be referred to as the presaturator section, is maintained at a much lower temperature than the rest of the column by means of water or other refrigerant, preferably water because of its availability and cheapness, circulating in the jacket, and since the solubility of hydrogen chloride in the solvents applicable to the process of the invention is materially increased at temperatures attainable by such means, appreciable quantities of the hydrogen chloride are dissolved by the solvent before it contacts the entering body of reaction mixture. Thus, a top as well as a bottom reflux is provided which greatly increases the efficiency of the process. The fat solvent is led via line 8 from the bottom of the column 5 and introduced as shown into a conventional stripping column 9, the function of which is to free the same of the butadiene dissolved therein. Column 9 will be noted as provided with a heat source 10. A portion of the top product from column 9 consisting almost entirely of butadiene is diverted by means of the line 7 to the base of column 5 to supply the before-mentioned bottom reflux. It is to be understood that the same effect could be achieved by the alternative method of heating the fat solvent at the base of column 5 in which case column 5 is also furnished with a heating element and line 7 is unnecessary. The lean solvent is conveyed from column 9 by a line 11 to the column 5 where it it re-used, while the undiverted butadiene is collected in the usual manner.

As stated, the condenser 4 is optional, that is, if desired, the reaction mixture may be introduced into the column 5 directly from the furnace or, more accurately, directly from the tar trap 3. In this event the unreacted dichloride and the unsaturated monochlorides are liquefied by contact with the relatively cool solvent and flow down the column intermixed therewith. Their removal from the solvent may be subsequently effected either in column 9 along with the butadiene or in the second stripping column having communication with column 9.

In the execution of the process as applied to the separation of hydrogen chloride from the reaction mixture produced by the pyrolysis of a dichlorbutane, any one or combination of the chlorobutenes present in the reaction mixture may be used as the solvent in the distillation column or, if desired, the heavy "ends" from the furnace may be thus employed. A still more preferred procedure is to employ the feed material to the furnace. The dichlorobutanes, i. e., dichlorobutane-1,2, dichlorobutane-1,3, dichlorobutane-1,4, dichlorobutane-2,3, exhibit great solvent power for butadiene in preference to hydrogen chloride and are otherwise satisfactory for the purpose of the process. When this procedure is followed, the dichlorobutane may be supplied to the distillation column by means of a line extending from the feed line of the furnace to the top of the column. Thus the mixture is treated only with fresh, unused solvent, which is distinctly advantageous. Under this arrangement, it is preferred to maintain the stripping column at a temperature only sufficient to drive off the butadiene and to continuously recycle the bottoms of said column to the furnace. A third column may be interposed in the line by means of which the bottoms of the stripping column are recycled to the furnace for the purpose of effecting the continuous removal of the unsaturated monochlorides which, as previously stated, are difficult to further dehydrohalogenate.

The following examples are introduced for the purpose of showing the results obtainable by the present process under specified operating conditions. The invention is not to be considered as limited, either to these conditions or the materials mentioned.

*Example I*

The reaction mixture resulting from the pyrolysis of a quantity of dichlorbutane analyzing 70%–80% hydrogen chloride was gradually introduced into an intermediate part of a distillation column of the type shown in the drawing, equipped with a jacketed upper section through which ice water was continuously circulated and packed with glass helices. Liquid dichlorbutane was simultaneously introduced at the top of the column. The solvent to feed ratio was approximately 1 volume of solvent to each 20 volumes of feed (liquid volume/gas volume) and the kettle temperature was about 97° C. Upon completion of the distillation, the top and bottom products were analyzed for olefins and hydrogen chloride respectively. The top product was found to contain less than 1% olefins and the bottom product less than 0.5% hydrogen chloride.

*Example II*

The experiment of Example I was repeated, but in place of dichlorobutane, the product resulting from the catalytic polymerization and hydrogenation of butane-butylene fractions generally referred to in the petroleum industry as "hot acid octane" was substituted as the solvent. The solvent to feed ratio was 1:20 and the kettle temperature 86° C. The tops analyzed less than 0.5% olefins and the bottoms about 2% hydrogen chloride.

*Example III*

The experiment of Example I was again repeated using an octane as the solvent. The kettle temperature was lowered to 66° C. and the amount of solvent reduced to 1 volume for each 45 volumes of feed. This resulted in a slight increase of olefins in the tops but a material decrease in the amount of hydrogen chloride in the bottoms. The exact analysis was 0.96% olefins in the top product; 0.061% HCl in the bottom product.

*Example IV*

The column of Example I was packed with metal staples and a gasoline fraction boiling between 150° C. and 175° C. employed to effect the separation of a synthetic mixture of butadiene and hydrogen chloride formed by combining a stream of butadiene flowing at the rate of 0.29 gram per minute and a stream of HCl flowing at the rate of 0.24 gram per minute. The feed rate of the solvent was about 5 cc. per minute and the kettle temperature was held at about 60° C. The top product analyzed 99% HCl and over 96% of the HCl was recovered.

In the appended claims the term "olefin" is intended as encompassing both mono-olefins and diolefins.

We claim as our invention:

1. A process for effecting the separation of a hydrogen halide from mixtures containing a hydrogen halide and a diolefin which comprises passing a vaporous mixture containing a hydrogen halide and a diolefin upwardly through a contact zone in countercurrent relation to a liquid organic material having a boiling temperature above that of the diolefin in the treated vaporous mixture and selected from the group consisting of hydrocarbons containing at least four carbon atoms, and halo-substituted hydrocarbons, continuously passed downwardly therethrough, to obtain a solution of the diolefin in the liquid organic material, continuously removing the separated hydrogen halide from the said contact zone, withdrawing the solution of the diolefin from the said zone, and recovering the extracted diolefin from the withdrawn solution.

2. A continuous process for separating butadiene from mixtures containing butadiene and a hydrogen halide which comprises continuously passing a mixture comprising butadiene and a hydrogen halide through a contact zone in countercurrent relation to a stream of a liquid dihalo-alkane, the halogen atoms of which correspond to the halogen atom of the halogen halide contained in the treated mixture, said liquid dihalo-alkane having a boiling temperature above that of butadiene, continuously conveyed through said zone to obtain a solution of the butadiene in the dihalo-alkane, continuously removing the separated hydrogen halide from said zone, withdrawing the solution of the butadiene from said zone, and recovering the extracted butadiene from said solution.

3. A process for separating a hydrogen halide from a mixture containing a hydrogen halide and an olefinic hydrocarbon comprising passing the mixture through a contact zone countercurrently to a stream of a liquid octane conveyed therethrough to extract the olefinic hydrocarbon from the mixture, removing the separated hydrogen halide from said contact zone, withdrawing from said contact zone the octane solution containing the olefinic hydrocarbon, and recovering the extracted olefinic hydrocarbon from the solution.

4. A continuous process for separating a hydrogen halide from a mixture containing a hydrogen halide and an olefinic compound which comprises continuously conveying the mixture through a contact zone in countercurrent relation to a liquid organic material having a boiling temperature above that of the olefinic compound in the treated mixture and selected from the group consisting of hydrocarbons containing at least four carbon atoms, and halo-substituted hydrocarbons, continuously conveyed through said zone under such conditions that the olefin is selectively absorbed by the liquid organic material, removing the separated hydrogen halide from said zone, and withdrawing from said zone the liquid organic material containing the dissolved olefinic hydrocarbon.

5. A process for separating butadiene from a mixture comprising butadiene and hydrogen chloride which comprises contacting the mixture with a liquid dichlorbutane to selectively dissolve a substantial portion of the butadiene, separating the hydrogen chloride from the resulting liquid solution of the butadiene, and recovering the butadiene from said solution.

6. A process for separating a hydrogen halide from an olefinic hydrocarbon which comprises contacting a mixture containing a hydrogen halide and an olefinic hydrocarbon with a liquid organic material having a boiling temperature above that of the olefinic hydrocarbon in the treated mixture and selected from the group consisting of hydrocarbons containing at least four carbon atoms, and halo-substituted hydrocarbons, to selectively dissolve substantially all of the olefinic hydrocarbon, separating the hydrogen halide from the resulting solution of the olefinic hydrocarbon, and recovering the olefinic hydrocarbon from said solution.

7. A process for effecting the recovery of a hydrogen halide in a substantially anhydrous state from a mixture thereof with at least one olefinic hydrocarbon which comprises contacting the mixture with a liquid organic material having a boiling temperature above that of the olefinic hydrocarbons in the treated mixture and selected from the group consisting of hydrocarbons containing at least four carbon atoms, and halo-substituted hydrocarbons, to selectively absorb the olefinic hydrocarbon, and separating the hydrogen halide from the resulting solution of the olefinic hydrocarbon in the liquid organic material.

8. The process of claim 4 wherein the treated mixture comprises halo-substituted hydrocarbons.

9. A process for effecting the separation of hydrogen chloride from a gaseous mixture containing hydrogen chloride and butadiene which comprises conveying the gaseous mixture upwardly through a vertically disposed contact zone, introducing liquid dichlorobutane into the upper part of said zone whereby a portion of the hydrogen chloride present therein is dissolved in said dichlorobutane, directing said hydrogen chloride-containing liquid dichlorobutane downwardly through said contact zone in countercurrent relation to said gaseous mixture to effect a solution of the butadiene in the liquid dichlorobutane, introducing butadiene vapors into the lower part of said contact zone to strip the liquid of the hydrogen chloride dissolved therein, withdrawing the separated hydrogen chloride from the upper part of the contact zone, withdrawing the butadiene-containing liquid dichlorobutane solution from the lower part of said zone, and recovering the extracted butadiene from the thus withdrawn solution.

10. A process for effecting the separation of hydrogen chloride from a gaseous mixture containing hydrogen chloride and butadiene, which comprises conveying the gaseous mixture upwardly through a vertically disposed contact zone, introducing a liquid octane into the upper part of said zone whereby a portion of the hydrogen chloride present therein is dissolved in said liquid octane, directing said hydrogen chloride-containing liquid octane downwardly through said contact zone in countercurrent relation to said gaseous mixture to effect a solution of the butadiene in the liquid octane, introducing butadiene vapors into the lower part of said contact zone to strip the liquid of the hydrogen chloride dissolved therein, withdrawing the separated hydrogen chloride from the upper part of the contact zone, withdrawing the butadiene-containing liquid octane solution from the lower part of said zone, and recovering the extracted butadiene from the thus withdrawn solution.

11. A process for effecting the separation of a hydrogen halide from a gaseous mixture containing a hydrogen halide and butadiene, which comprises conveying the gaseous mixture upwardly through a vertically disposed contact zone, introducing a liquid organic material having a boiling temperature above that of butadiene and selected from the group consisting of hydrocarbons containing at least four carbon atoms, and halo-substituted hydrocarbons, into the upper part of said zone whereby a portion of the hydrogen halide present therein is dissolved in said organic material, directing said hydrogen halide-containing liquid organic material downwardly through said contact zone in countercurrent relation to said gaseous mixture to effect a solution of the butadiene in the liquid organic material, introducing butadiene vapors into the lower part of said contact zone to strip the liquid material of the hydrogen halide dissolved therein, withdrawing the separated hydrogen halide from the upper part of the contact zone, withdrawing the butadiene-containing liquid solution from the lower part of said zone, and recovering the extracted butadiene from the thus withdrawn solution.

THEODORE W. EVANS.
HARRY DE V. FINCH.
GEORGE W. HEARNE.